United States Patent
Dhakshinamoorthy et al.

(10) Patent No.: US 10,878,012 B2
(45) Date of Patent: Dec. 29, 2020

(54) INTELLIGENT PLANT OPERATOR LOG BOOK INFORMATION RETRIEVAL MECHANISM USING LATENT SEMANTIC ANALYSIS AND TOPIC MODELING FOR CONNECTED PLANTS

(71) Applicant: Honeywell International Inc., Morris Plains, NJ (US)

(72) Inventors: Chandirasekaran Dhakshinamoorthy, Govindasalai (IN); Janarthanan Shanmugam, Erode (IN); Amit Vinod Bajpaye, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 156 days.

(21) Appl. No.: 16/014,349

(22) Filed: Jun. 21, 2018

(65) Prior Publication Data

US 2019/0392076 A1 Dec. 26, 2019

(51) Int. Cl.
*G06F 16/33* (2019.01)
*G06F 16/338* (2019.01)
*G06F 16/35* (2019.01)
*G06F 16/332* (2019.01)
*G06F 40/30* (2020.01)

(52) U.S. Cl.
CPC ........ *G06F 16/3344* (2019.01); *G06F 16/338* (2019.01); *G06F 16/3329* (2019.01); *G06F 16/35* (2019.01); *G06F 40/30* (2020.01)

(58) Field of Classification Search
CPC .............................. G06F 16/3329; G06F 16/35
See application file for complete search history.

(56) References Cited

U.S. PATENT DOCUMENTS

| | | | | |
|---|---|---|---|---|
| 8,996,350 B1* | 3/2015 | Dub | ...................... | G06F 16/285 704/1 |
| 2006/0235696 A1* | 10/2006 | Bennett | ................... | G06F 17/27 704/270.1 |
| 2010/0280985 A1* | 11/2010 | Duchon | ................. | G06N 7/005 706/52 |
| 2011/0131228 A1* | 6/2011 | Raskina | ............... | G06F 16/355 707/760 |
| 2012/0030201 A1* | 2/2012 | Pickering | .............. | G06F 16/334 707/728 |
| 2012/0078869 A1* | 3/2012 | Bellville | ................. | G06F 16/90 707/706 |

OTHER PUBLICATIONS

Honeywell International Inc., "Operations Logbook", Product Information Note, Jan. 2013, 3 pages.

* cited by examiner

*Primary Examiner* — Charles E Lu

(57) ABSTRACT

This disclosure provides an apparatus and method for intelligent data access using latent semantic analysis and topic modeling. A method includes receiving, by a semantic query processing engine, a set of operator logbooks that include computer-readable text, receiving a natural language query, performing latent semantic analysis on the set of operator logbooks that include computer-readable text and the natural language query, and generating an ordered list of operator logbooks from the set of operator logbooks that include computer-readable text, wherein the ordered list of operator logbooks is ordered by relevance to the natural language query as determined using the latent semantic analysis.

15 Claims, 5 Drawing Sheets

INTELLIGENT PLANT OPERATOR LOG BOOK INFORMATION RETRIEVAL MECHANISM USING LATENT SEMANTIC ANALYSIS AND TOPIC MODELING FOR CONNECTED PLANTS

TECHNICAL FIELD

This disclosure relates generally to connected industrial process control and automation systems. More specifically, this disclosure relates to an apparatus and method for intelligent operator logbook data access using latent semantic analysis and topic modelling.

BACKGROUND

Industrial process control and automation systems are often used to automate large and complex industrial processes. These types of control and automation systems routinely include process controllers and field devices like sensors and actuators. Events that occur in these types of process control and automation systems are typically logged in a logbook. The logbook includes actions taken by operators who were on duty at the time of the event. Other operators may use this information, for example, to determine how a previous event was handled by the operator on duty at the time.

SUMMARY

This disclosure an apparatus and method for intelligent operator logbook data access using latent semantic analysis and topic modeling.

In a first embodiment, a method includes receiving, by a semantic query processing engine, a set of operator logbooks that include computer-readable text, performing latent semantic analysis on the set of operator logbooks that include computer-readable text and the natural language query, and generating an ordered list of operator logbooks from the set of operator logbooks that include computer-readable text, wherein the ordered list of operator logbooks is ordered by relevance to the natural language query as determined using the latent semantic analysis.

In a second embodiment, an apparatus includes a memory and a processor configured to implement a semantic query engine. The processor is further configured to receive, at the semantic query processing engine, a natural language query, perform, using the semantic query processing engine, latent semantic analysis on the set of operator logbooks that include computer-readable text and the natural language query, and generate and store in the memory an ordered list of operator logbooks from the set of operator logbooks that include computer-readable text, wherein the ordered list of operator logbooks is ordered by relevance to the natural language query as determined using the latent semantic analysis.

In a third embodiment, a non-transitory computer readable medium containing instructions that, when executed by at least one processing device of a remote control system, cause the at least one processing device to receive, at a semantic query processing engine, a natural language query, perform, using the semantic query processing engine, latent semantic analysis on the set of operator logbooks that include computer-readable text and the natural language query, and generate an ordered list of operator logbooks from the set of operator logbooks that include computer-readable text, wherein the ordered list of operator logbooks is ordered by relevance to the natural language query as determined using the latent semantic analysis.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Embodiments of the present disclosure contemplate that operator logbooks in industrial process facilities may contain logs describing how an operator has historically handled a particular alarm, system notification, or other event. This information can be useful to a different operator who has not encountered that particular event before and does not know how to handle the event (for example, an inexperienced operator who still has holes in their knowledge). Accordingly, it would be useful for the inexperienced operator to be able to quickly access information contained in existing logbooks that would describe how other operators have historically handled an event.

Operator logbooks are generated after every operator shift as natural language descriptions of the events that occurred during the shift. However, the logbooks are often stored in a format that does not contain computer-readable text, such as an unstructured text format (for example, the PDF format). There is no easy way for an operator to use a computer to search through existing logbooks for contextual or relevant information pertinent to the event that they are trying to handle. Rather, they are forced to open logbooks one-by-one to look for similar events. Searching in this way is simply not feasible if the event is time-sensitive. Accordingly, embodiments of the present disclosure contemplate conversion of operator logbooks to a computer-readable format, and use of an artificial-intelligence-enabled natural language search through the operator logbooks using latent semantic analysis algorithms. That is, the present disclosure includes systems and methods that allow a user to enter a natural language query into a computer (either by text input or using voice-to-text input, for example through a voice assistant), and to receive a list of relevant logbooks in response. In some embodiments, the list of logbooks is returned with a relevance score, and is ranked from most to least relevant. The operator can then simply open the logbooks directly from the returned list to find the desired logs describing how previous operators have handled similar events.

Figure 1:
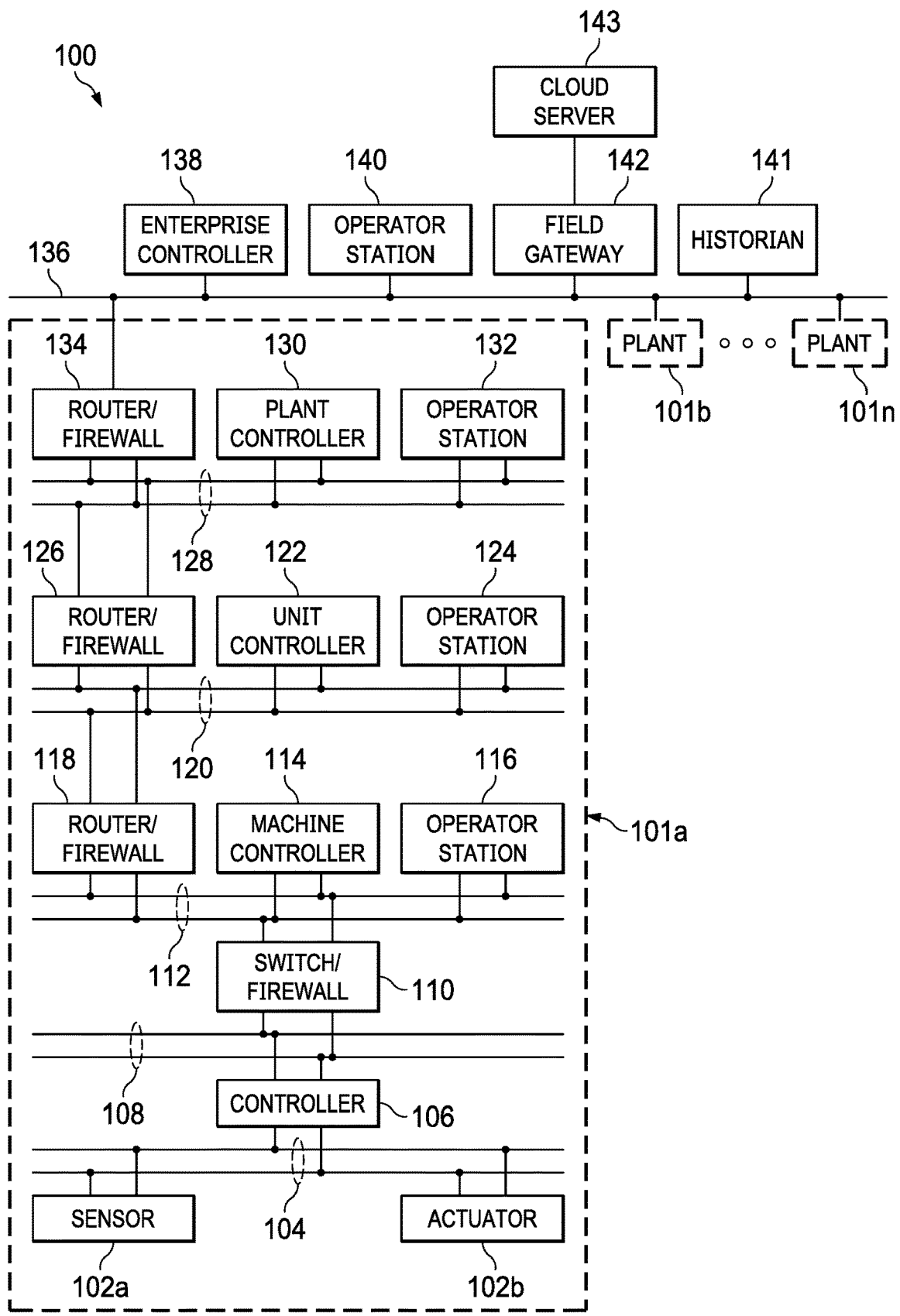
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

Redundant networks 104 are coupled to the sensors 102a and actuators 102b. The networks 104 facilitate interaction with the sensors 102a and actuators 102b. For example, the networks 104 could transport measurement data from the sensors 102a and provide control signals to the actuators 102b. The networks 104 could represent any suitable redundant networks. As particular examples, the networks 104 could represent redundant IEC-61850, IEC-62439, Ethernet/IP (EIP), or MODBUS/TCP networks. The networks 104 can have any suitable configuration, such as a parallel or ring topology. The networks 104 are often referred to as "industrial control" networks since these networks transport data used directly to control the underlying process system.

In the Purdue model, "Level 1" includes one or more controller groups 106, which are coupled to the networks 104. Among other things, each controller group 106 may use the measurements from one or more sensors 102a to control the operation of one or more actuators 102b. Each controller in the controller groups 106 includes any suitable structure for controlling one or more aspects of a process system. As a particular example, each controller in the controller groups 106 could represent a computing device running a real-time operating system.

Redundant networks 108 are coupled to the controller groups 106. The networks 108 facilitate interaction with the controller groups 106, such as by transporting data to and from the controller groups 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC. The networks 108 are often referred to as "supervisory" networks since these networks transport data used to supervise the underlying "Level 1" controllers.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controller groups 106, sensors 102a, and actuators 102b, which could be associated with a particular piece of industrial equipment (such as a boiler or other machine). For example, the machine-level controllers 114 could log information collected or generated by the controller groups 106, such as measurement data from the sensors 102a or control signals for the actuators 102b. The machine-level controllers 114 could also execute applications that control the operation of the controller groups 106, thereby controlling the operation of the actuators 102b. In addition, the machine-level controllers 114 could provide secure access to the controller groups 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controller groups 106, sensors 102a, and actuators 102b).

One or more operator stations 116 are coupled to the networks 112. The operator stations 116 represent computing or communication devices providing user access to the machine-level controllers 114, which could then provide user access to the controller groups 106 (and possibly the sensors 102a and actuators 102b). As particular examples, the operator stations 116 could allow users to review the operational history of the sensors 102a and actuators 102b using information collected by the controller groups 106 and/or the machine-level controllers 114. The operator stations 116 could also allow the users to adjust the operation of the sensors 102a, actuators 102b, controller groups 106, or machine-level controllers 114. In addition, the operator stations 116 could receive and display warnings, alerts, or other messages or displays generated by the controller groups 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controller groups 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 141 is also coupled to the network 136 in this example. The historian 141 could represent a component that stores various information about the system 100. The historian 141 could, for example, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In accordance with this disclosure, as described in more detail below, at least one component of system 100 could support a mechanism for performing latent semantic analysis and topic modelling on operator logbooks (i.e., on historical data related to events and operator actions in the plant). For example, this functionality could be implemented in equipment at Level 4 of a given plant, such as an operator station 132 of a plant 101a. In this way, an operator can be provided with the ability to use natural language search to find desired information in operator logbooks for the plant 101a about events that have occurred in the plant. In other embodiments, this functionality could be implemented remotely, for example in a cloud server 143, connected to the plant 101a in this example through a field gateway 142. The cloud server 143 may be connected to other plants 101b-

101n, thus providing latent semantic analysis and operator logbook storage for multiple plants.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which latent semantic analysis can be used. This functionality can be used in any other suitable device or system.

Figure 2:
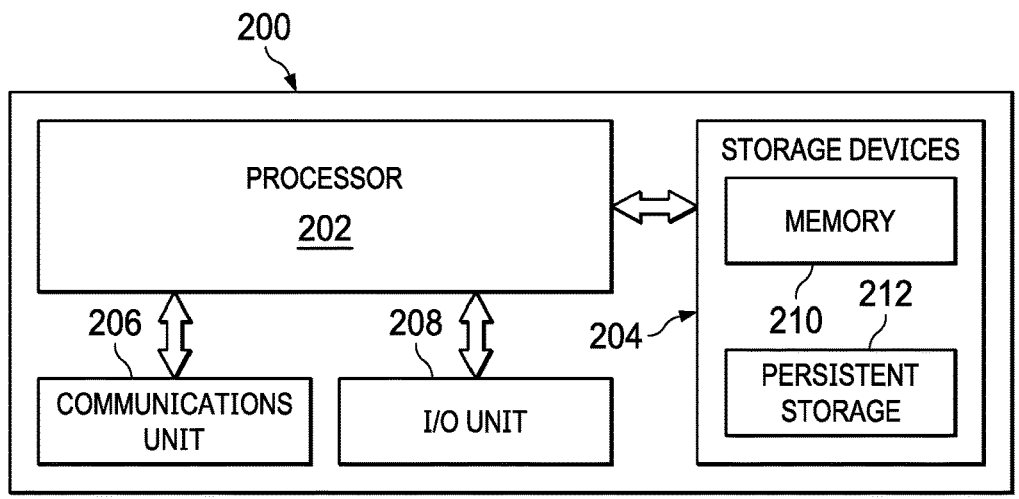
FIG. 2 illustrates an example device for intelligently querying historical plant data such as operator logbook data using latent semantic analysis and topic modelling according to this disclosure.

FIG. 2 illustrates an example device 200 for intelligently querying historical plant data such as operator logbook data using latent semantic analysis and topic modelling according to this disclosure. The device 200 could, for example, denote an operator console 132 described above with respect to FIG. 1. However, the device 200 could be any other suitable device. For example, in some embodiments the device 200 could be a cloud server 143, providing the below functionality to plants, such as plants 101a-101n, remotely.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could intelligently process queries for operator logbook data using latent semantic analysis and topic modelling. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for intelligently querying historical plant data such as operator logbook data using latent semantic analysis, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
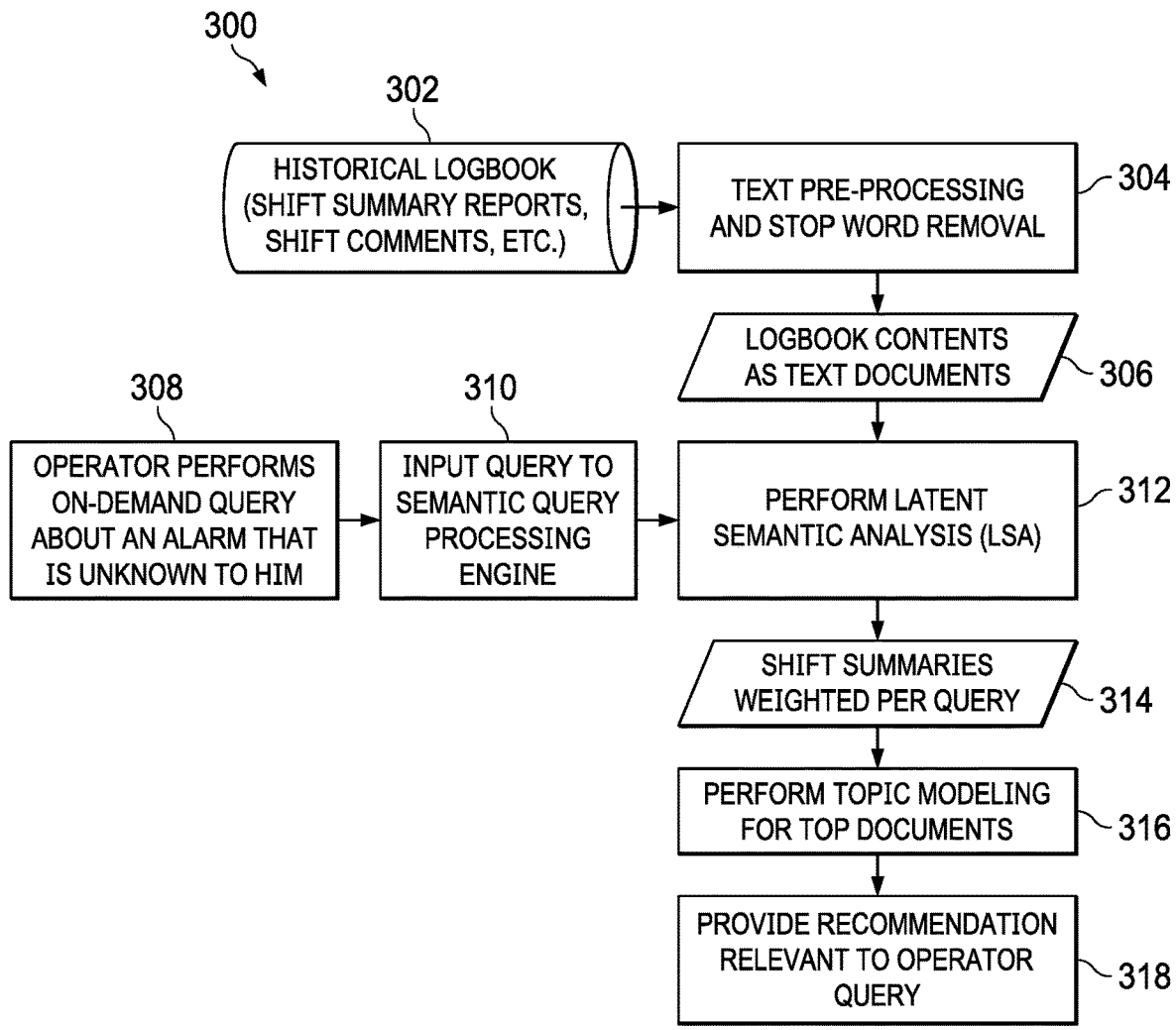
FIG. 3 illustrates an example process flow for latent semantic analysis and topic modelling according to this disclosure.

FIG. 3 illustrates an example process flow 300 for latent semantic analysis and topic modelling according to this disclosure. The process flow could be implemented on a device such as the device 200. However, the process flow could also be implemented on any suitable device.

A database 302 of historical operator logbooks can include shift summary reports, shift comments, and any other relevant reports. Such reports may be created by an operator at the end of a shift according to protocol in order to provide a record of occurrences during an operator's shift. Such a record can help process plants run more effectively and reduce errors by allowing for review of the record to determine how to resolve any issues that occur. In some embodiments, the database 302 including the operator logbooks is stored locally, for example, in the operator console 132. In other embodiments, the database 302 including the operator logbooks is stored in remote storage, for example in cloud server 143.

The contents of the database are, in some embodiments, unstructured text documents that contain non-computer-readable text (for example, PDF documents), in which case the process performs text pre-processing including stop word (or noise) removal on the non-text documents at step 304 to convert them to a machine-readable text format (e.g., by optical character recognition) as well as to remove frequently occurring words that cause noise in latent semantic analysis. A list of stop words is predetermined based on the types of documents being analyzed. That is, the list of stop words includes domain-specific common terms (e.g., common terms specific to the domain of industrial process operation control). For example, if the documents being preprocessed are known to be operator shift summaries, a list of stop words particular to the language used in operator shift summaries can be developed and applied to reduce noise in latent semantic analysis. The result of text preprocessing including stop word (or noise) removal step 304 is a set of documents 306 that comprises operator logbook shift summaries as text documents with stop words removed. The set of documents 306 can be queried using latent semantic analysis.

An operator that wishes to search through logbooks can enter a natural language semantic query into the process at step 308. This query could be input through text input (i.e., using a keyboard), through a voice assistant (i.e., using voice to text), or through any other suitable input method. In this embodiment, the operator is performing a query related to an alarm that he does not know how to handle in order to determine how other operators have previously handled this alarm. For example, the query could be "how to handle P101-A alarm." The natural language semantic query is input to a semantic query processing engine at step 310. This could include, for example, transmitting the natural language semantic query to a cloud server, which could include the latent semantic query processing engine. The latent semantic query engine, at step 312, uses latent semantic analysis to locate entries from the set of documents 306, which is illustrated in part in FIG. 4.

Figure 4:
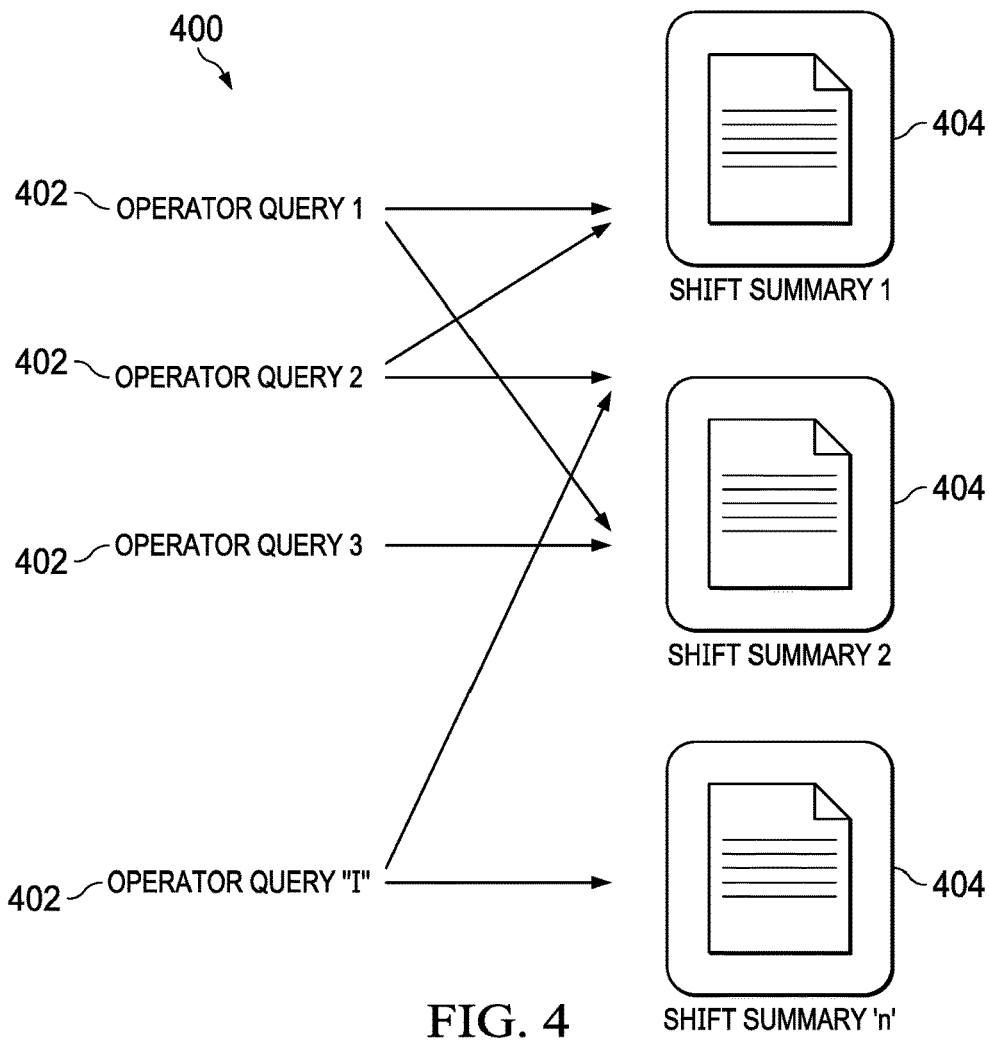
FIG. 4 illustrates an example semantic query process according to this disclosure.

Referring now to FIG. 4, there is illustrated an example semantic query process 400 according to this disclosure. As illustrated, a given operator query 402 (which can be a semantic query) may return one or more shift summaries 404 as a result. Additionally, different semantic queries 402 may return overlapping or same shift summaries 404 as results. That is, a given shift summary 404 can be returned as a result for one or more different queries 402, and different queries 402 can return the same shift summary 404.

Returning to FIG. 3, the latent semantic analysis step 312 includes removing "noise" from the text of the set of documents 306. In this context, noise refers to words that do not add value to the searching process of the latent semantic analysis algorithm (i.e., words that do not pertain to desirable results of a semantic query for previous events). For example, common words such as "and," "the," are filtered out from consideration by the latent semantic analysis algorithm. Additionally, some words that are frequently used in the specific context of the operator logbook in the industry, but which do not add to the value of the search, are considered noise and are removed from consideration by the latent semantic analysis algorithm. For example, words that are standardly used in operator shift summaries but which do not pertain to any sort of event are filtered out.

Once the noise is removed from the documents, a latent semantic indexing process is performed to convert the data into a matrix form, and single value decomposition is applied to reduce the dimensionality of the matrix. The input query from step 310 is transformed into a vector, which is treated as a document for purposes of comparison with other documents in the matrix for determination of conceptual similarity between the query and the other documents.

The output of the latent semantic analysis step 312 is a list 314 of shift summaries that are weighted and ordered by relevance to the query of step 310. In some embodiments, the top ten to fifteen most relevant documents are returned in the list 314. The documents in the list 314 are then input to a topic modeling process at step 316. The topic modeling process of step 316 determines what topics the documents of list 314 are related to, as illustrated further in FIG. 5.

Figure 5:
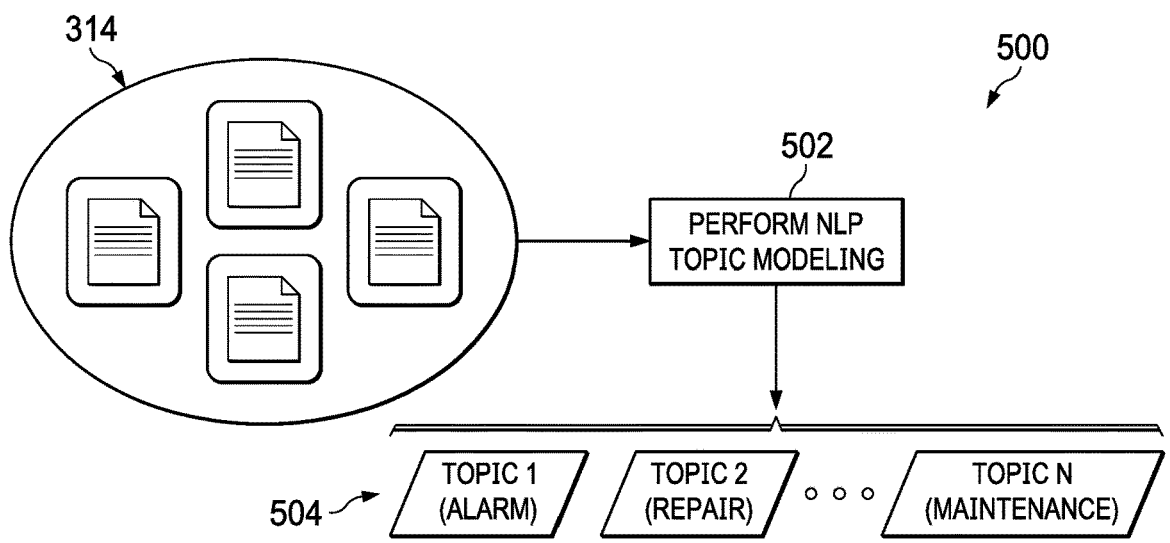
FIG. 5 illustrates an example topic modeling process that is performed on a subset of the results of the semantic query according to this disclosure.

Referring now to FIG. 5, there is illustrated an example topic modeling process 500 that is performed on a subset of the results of the semantic query (for example, ten to fifteen of the results). The topic modeling process uses natural language processing at step 502 to analyze the weighted and ordered list 314 of shift summaries to determine a list of topics 504 covered by the shift summaries. In some embodiments, latent Dirichlet allocation (LDA) is used to perform topic modeling, but it is understood that any suitable methodology may be used. This list of topics 504 can be used to further adjust the relevance rating of each shift summary before presenting it to the operator. Additionally or alternatively, the list of topics 504 can be used to "tag" each shift summary of the ordered list 314 of shift summaries with a list of topics contained in the shift summary.

Figure 6:
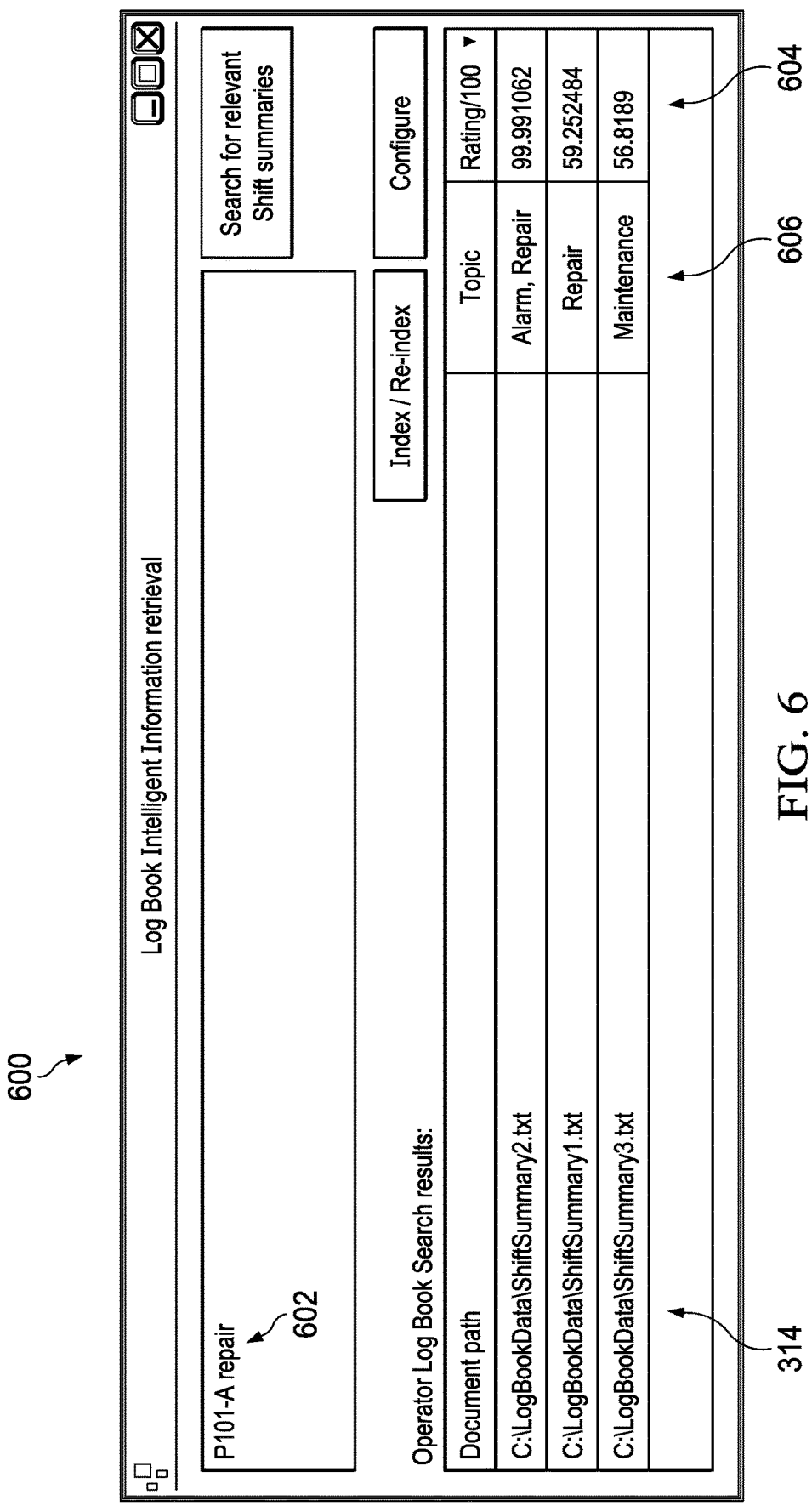
FIG. 6 illustrates an example ordered list of operator logbooks according to this disclosure.

Returning to FIG. 3, once topic modelling is complete, at step 318 a final list of recommended shift summary documents is provided to the operator, ranked by relevance to the initial query provided by the operator. An example ordered list 600 of operator logbooks is illustrated in FIG. 6. In the example of FIG. 6, an operator has received an alarm for a faulty P101-A component, and enters the natural language query 602 "P101-A repair" (e.g., as described above with reference to step 310) in order to determine if an operator on another shift has encountered and remedied this issue in the past. The system returns a weighted and ordered list 314 of three relevant shift summary documents along with a relevance rating 604 for each document (in this example, rated out of 100 points). In some embodiments, a list of topics 606 (determined, for example, using the above-described topic modeling process) are displayed for each shift summary. For example, a non-exclusive list of topics relevant to industrial processing includes alarm, repair, pump, boiler, and maintenance. The operator is then able to directly open the returned shift summaries from this list, for example by double clicking on one of the entries. It is understood that any number of shift summaries could be returned, depending on configuration of the system. In this way, the operator is able to intuitively and quickly locate relevant information from a database of shift summaries, rather than having to manually search through shift summaries to find a relevant entry to help them solve an issue.

Upon receiving the list of shift summaries and opening the shift summaries that are most relevant, the operator can find information relating to their query. For example, in a hydrotreater plant, a recycle oil pump provides flow to a heater that heats hydrocarbons that are then transferred to a reactor. The heater is used to heat the hydrocarbons from 340° C. to 350° C., and has emergency safety device (ESD) trip logic that shuts down the heater if the flow rate is too low, because heating an underfilled pipe can for too long can cause damage to the pipeline material. Heating an underfilled pipe can even result in a catastrophic blast if pipeline material is damaged so much that it comes loose and gets into the heater, where it can catch fire from the heater's burner flame. When starting up the hydrotreater plant after plant shutdown, there will not be much flow in a pump discharge line that goes to the heater, and the ESD trip logic will not allow the heater to start until its pipeline has sufficient flow. The operator could query the operator logbooks to discover how to start up the heater, and the most relevant logbook results could inform the operator that other operators have bypassed the low flow ESD trip logic to start the heater despite the initial low flow.

In another example, in a compressor, lube oil is circulated to internals of a compressor to keep the internals lubricated and functioning well. The lube oil should be, in this example, kept above 45° C. The compressor, therefore, has ESD trip logic that shuts down the compressor when the lube oil is below 45° C. When the compressor is starting up from a plant shutdown, the lube oil will be received from a storage tank and will not be above 45° C., so the ESD trip logic will not allow the compressor to start. Similar to the above example, the operator could query the operator logbooks to discover how to start up the compressor, and the most relevant logbook results could inform the operator that other operators have bypassed the low temperature ESD trip logic to start the compressor despite the initial low lube oil temperature. Alternatively, a relevant logbook could inform the operator that previous operators have simulated temperature inputs above 45° C. to the low temperature ESD trip logic to prevent the logic from tripping shutdown of the compressor, achieving the same result in a different manner.

In another example, plants generally can have emergency shutdown systems that are triggered by a number of different unhealthy conditions from sensors. As plant shutdowns can cause many issues, it is desirable to avoid shutdowns in the case that sensor readings are faulty and are approaching readings that would cause a shutdown. If it is known that a sensor is faulty and providing a reading that is approaching shutdown (e.g., if another measurement is available to indicate that the sensor is faulty), the operator could query the operator logbooks to discover how to avoid plant shutdown in this scenario, and the most relevant logbook results could inform the operator that other operators have simulated sensor inputs at healthy values to the emergency shutdown systems until the sensor is repaired or replaced.

Figure 7:
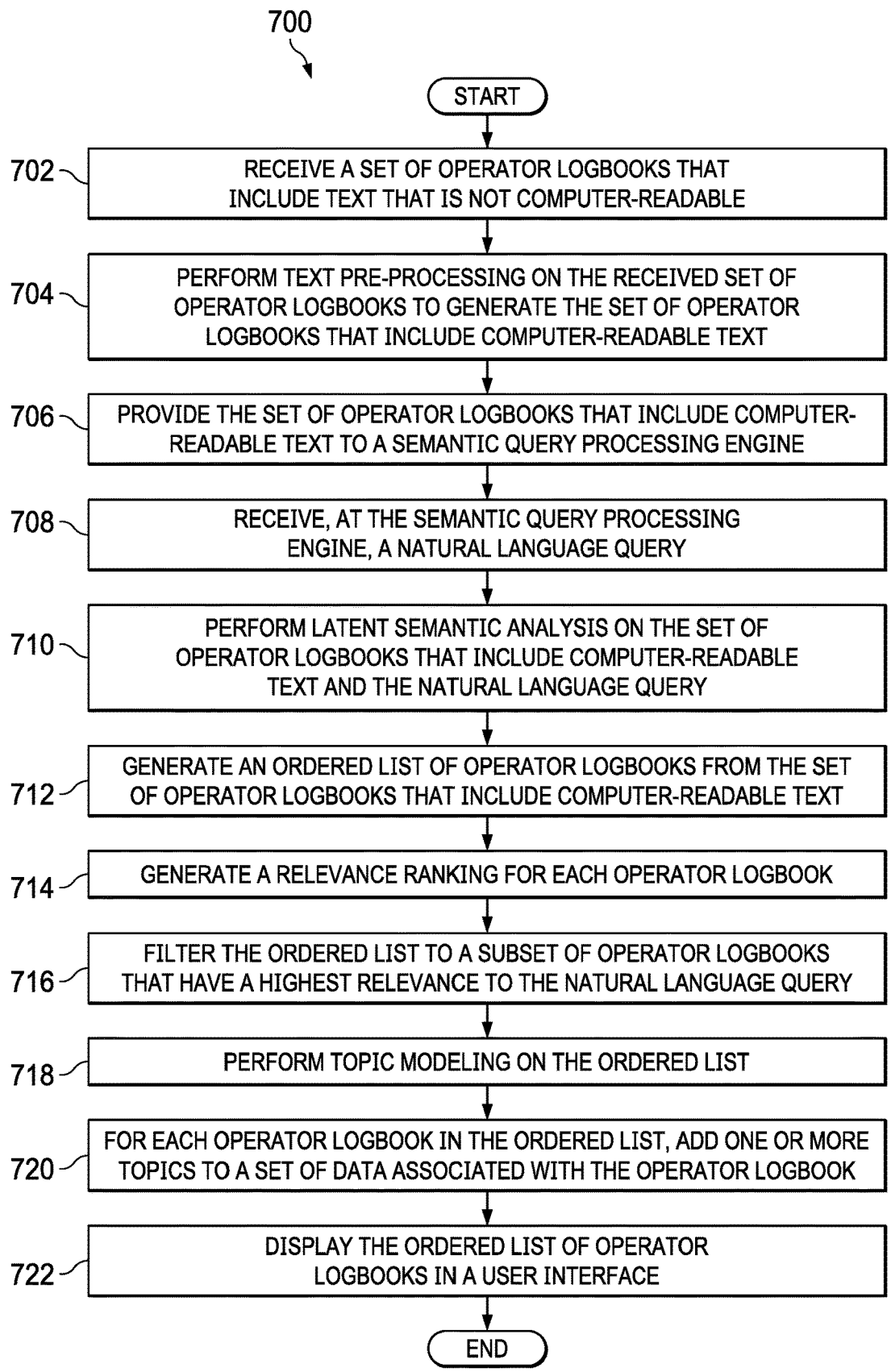
FIG. 7 illustrates an example method for intelligent data access using latent semantic analysis and topic modeling according to this disclosure.

FIG. 7 illustrates an example method 700 for intelligent data access using latent semantic analysis and topic modeling according to this disclosure. For simplicity, the method 700 will be considered to be implemented using a device 200, but it is understood that the method 700 could be implemented on any suitable device.

At step 702, the device receives a set of operator logbooks that do not contain computer-readable text. For example, the set of operator logbooks may be in a PDF format, or any other format in which text is not computer-readable. At step 704, text pre-processing including stop word removal is performed on the set of operator logbooks to generate a new set of operator logbooks that contains computer-readable text.

At step 706, the set of operator logbooks that contains computer-readable text is provided to a semantic query processing engine so that latent semantic analysis can be performed on the operator logbooks, as will be described further below. At step 708, the semantic query processing engine receives a natural language query. For example, an operator of an industrial facility can provide the natural language query. In some embodiments, the query could be "P-101A repair," which is a natural language query related to a malfunctioning device that the operator is unsure how to repair.

At step 710, the semantic query processing engine performs latent semantic analysis on the set of operator logbooks that contains computer-readable text and the natural language query, as described above with respect to FIGS. 3 and 4.

At step 712, the semantic query processing engine, based on the latent semantic analysis, generates an ordered list of operator logbooks from the set of operator logbooks that include computer-readable text. In some embodiments, the ordered list of operator logbooks is ordered by relevance to the natural language query as determined using the latent semantic analysis. This can include, at step 714, generating a relevance rating for each operator logbook, where the relevance rating indicating a level of relevance of each operator logbook to the natural language query. For example, a score on a scale of 0-100 could be given to each operator logbook to indicate its relevance. The relevance rating can then be added to a set of data associated with each respective operator logbook.

At step 716, the semantic query processing engine filters the ordered list of operator logbooks so that the ordered list of operator logbooks includes a subset of the set of operator logbooks that have a highest relevance to the natural language query. For example, the ten to fifteen most relevant operator logbooks, based on their relevance ratings, could be selected, and the rest of the operator logbooks removed from the ordered list.

At step 718, topic modeling is performed on the ordered list of operator logbooks to determine at least one topic included in each operator logbook, as described above with reference to FIG. 5. As a result, one or more topics may be identified in each operator logbook.

At step 720, for each operator logbook, one or more topic determined by the topic modeling is added to the set of data associated with the operator logbook. The set of data could also include the relevance rating, as described above.

At step 722, a display displays the ordered list of operator logbooks in a user interface, for example, as described above with reference to FIG. 6. Each operator logbook in the ordered list of operator logbooks can be accessed from the user interface. For example, the operator can select an operator logbook to open it in an appropriate viewing program. In some embodiments, each operator logbook displayed in the user interface may also be displayed along with the data associated with it (e.g., any topics identified in the logbook, and its relevance rating).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for intelligent data access of operator logbooks for an industrial process and control system using latent semantic analysis and topic modeling comprising:
    receiving, by a semantic query processing engine, a set of operator logbooks used in the industrial process and control system, that include computer-readable text, and a further set of operator logbooks that are in a format in which text is not computer-readable;
    receiving, by the semantic query processing engine, a natural language query;
    performing, by the semantic query processing engine, latent semantic analysis on the set of operator logbooks that include computer-readable text and the natural language query;
    generating an ordered list of operator logbooks from the set of operator logbooks that include computer-readable text, wherein the ordered list of operator logbooks is ordered by relevance to the natural language query as determined using the latent semantic analysis;
    generating a relevance rating for each operator logbook in the ordered list of operator logbooks using the latent semantic analysis, the relevance rating indicating a level of relevance of each operator logbook to the natural language query;
    adding the relevance rating to a set of data associated with the operator logbook;
    performing topic modeling on the ordered list of operator logbooks to determine at least one topic included in each operator logbook of the ordered list of operator logbooks; and
    operating an industrial control system by displaying the ordered list of operator logbooks in a user interface, including a final list of recommended shift summary documents, ranked by relevance.

2. The method of claim 1, wherein receiving the natural language query further comprises:
    receiving a voice input; and
    performing voice-to-text conversion on the received voice input to receive the natural language query.

3. The method of claim 1, wherein the semantic query processing engine is implemented in a cloud server.

4. The method of claim 1, further comprising:
    receiving a second set of operator logbooks that include text that is not computer readable; and
    performing text pre-processing and stop word removal on the second set of operator logbooks to generate the set of operator logbooks that include computer-readable text, the text pre-processing and stop word removal including removal of domain-specific common terms.

5. The method of claim 1, further comprising performing the topic modeling using latent Dirichlet allocation (LDA).

6. The method of claim 1, further comprising:
    before performing the topic modeling, filtering the ordered list of operator logbooks so that the ordered list of operator logbooks includes a subset of the set of operator logbooks that have a highest relevance to the natural language query.

7. The method of claim 1, further comprising:
    for each operator logbook in the ordered list of operator logbooks, adding one or more topics determined by the topic modeling to a set of data associated with the operator logbook.

8. The method of claim 1, further comprising:
    displaying the ordered list of operator logbooks in a user interface, wherein each operator logbook in the ordered list of operator logbooks are accessed from the user interface.

9. An apparatus for intelligent data access of operator logbooks for an industrial process and control system using latent semantic analysis and topic modeling comprising:
    a memory; and
    a processor configured to implement a semantic query processing engine, the processor further configured to:
        receive, at the semantic query processing engine, a set of operator logbooks used in an industrial process and control system, that include computer-readable text and a further set of operator logbooks that are in a format in which text is not computer-readable;
        receive, at the semantic query processing engine, a natural language query;
        perform, using the semantic query processing engine, latent semantic analysis on the set of operator logbooks that include computer-readable text and the natural language query;
        generate and store in the memory an ordered list of operator logbooks from the set of operator logbooks that include computer-readable text, wherein the ordered list of operator logbooks is ordered by relevance to the natural language query as determined using the latent semantic analysis;
        generate a relevance rating for each operator logbook in the ordered list of operator logbooks using the latent semantic analysis, the relevance rating indicating a level of relevance of each operator logbook to the natural language query;
        add the relevance rating to a set of data associated with the operator logbook; and
        perform topic modeling on the ordered list of operator logbooks to determine at least one topic included in each operator logbook of the ordered list of operator logbooks; and
        operate an industrial control system by displaying the ordered list of operator logbooks in a user interface, including a final list of recommended shift summary documents, ranked by relevance.

10. The apparatus of claim 9, wherein the processor is further configured to:
    receive a second set of operator logbooks that include text that is not computer readable; and
    perform text pre-processing and stop word removal on the second set of operator logbooks to generate the set of operator logbooks that include computer-readable text, the text pre-processing and stop word removal including removal of domain-specific common terms.

11. The apparatus of claim 9, wherein the processor is further configured to:
    before performing the topic modeling, filter the ordered list of operator logbooks so that the ordered list of operator logbooks includes a subset of the set of operator logbooks that have a highest relevance to the natural language query.

12. The apparatus of claim 9, wherein the processor is further configured to:
    for each operator logbook in the ordered list of operator logbooks, add one or more topics determined by the topic modeling to a set of data associated with the operator logbook.

13. The apparatus of claim 9, wherein the processor is further configured to:

display the ordered list of operator logbooks in a user interface, wherein each operator logbook in the ordered list of operator logbooks are accessed from the user interface.

14. A non-transitory computer readable medium containing instructions that, when executed by at least one processing device of a remote control system for intelligent data access of operator logbooks for an industrial process and control system using latent semantic analysis and topic modeling, cause the at least one processing device to:

receive, at a semantic query processing engine, a set of operator logbooks used in an industrial process and control system, that include computer-readable text and a further set of operator logbooks that are in a format in which text is not computer-readable;

receive, at a semantic query processing engine, a natural language query;

perform, using the semantic query processing engine, latent semantic analysis on the set of operator logbooks that include computer-readable text and the natural language query;

generate an ordered list of operator logbooks from the set of operator logbooks that include computer-readable text, wherein the ordered list of operator logbooks is ordered by relevance to the natural language query as determined using the latent semantic analysis;

generate a relevance rating for each operator logbook in the ordered list of operator logbooks using the latent semantic analysis, the relevance rating indicating a level of relevance of each operator logbook to the natural language query;

add the relevance rating to a set of data associated with the operator logbook; and perform topic modeling on the ordered list of operator logbooks to determine at least one topic included in each operator logbook of the ordered list of operator logbooks; and operate an industrial control system by displaying the ordered list of operator logbooks in a user interface, including a final list of recommended shift summary documents, ranked by relevance.

15. The non-transitory computer readable medium of claim 14, wherein the instructions further cause the at least one processing device to:

receive a second set of operator logbooks that include text that is not computer readable; and perform text pre-processing and stop word removal on the second set of operator logbooks to generate the set of operator logbooks that include computer-readable text.

* * * * *